United States
Heiniger et al.

[11] 3,781,098
[45] Dec. 25, 1973

[54] CONTROL APPARATUS FOR VARYING FOCAL LENGTH OF CINEMATOGRAPHIC ZOOM LENS

[75] Inventors: Wilfred Heiniger; Gérard Lepinay, both of Yverdon, Switzerland

[73] Assignee: Bolex International SA, Sainte-Croix, Switzerland

[22] Filed: May 26, 1972

[21] Appl. No.: 257,075

[30] Foreign Application Priority Data
June 2, 1971  Switzerland.......................... 8078/71

[52] U.S. Cl................................. 352/140, 350/187
[51] Int. Cl. ........................................... G03b 3/00

[58] Field of Search........................... 352/139, 140; 350/187

[56] References Cited
FOREIGN PATENTS OR APPLICATIONS
771,898  11/1967  Canada.............................. 350/187

Primary Examiner—Monroe H. Hayes
Attorney—Edward Dreyfus

[57] ABSTRACT

A cinematographic apparatus provided with a zoom lens comprising focal length varying means for varying the focal length of the lens during film standstill periods and for fixing the same during obturation periods.

5 Claims, 3 Drawing Figures

PATENTED DEC 25 1973
3,781,098

CONTROL APPARATUS FOR VARYING FOCAL LENGTH OF CINEMATOGRAPHIC ZOOM LENS

FIELD OF INVENTION

This invention relates to apparatus for varying the focal length for a cinematographic zoom lens and more particularly to a novel arrangement for controlling focal length variations so as to avoid unwanted magnification "jerks" or discontinuities in successively projected film images and to thereby obtain a smooth and continuous variation in magnification in the sequence of projected images.

PRIOR ART

Prior cinematographic apparatus with zoom lens are commonly provided with focal length varying means operated by an electric high speed motor rotating with a speed of 3,000 to 6,000 R.P.M. However, the film advance in cinematographic apparatus is realized by a step-by-step mechanism, and the light beam is periodically interrupted by an obturator during the advance movement of the film.

Since the focal length (thus the magnification) of these prior systems varies continuously but cannot be observed during the obturation periods, the change in magnification is discontinuous or jerky on successively projected frame images. This disadvantage is particularly visible in a camera wherein the jerks are more objectionable if the incremental change from one focal length to another for successive film images is increased by rapid operation of the zoom lens.

SUMMARY OF INVENTION

The present invention provides a new and improved zoom lens control which varies the focal length such that continuous magnification variation is achieved in successively projected images. According to the invention, the control apparatus varies the focal length during the periods when the film is at rest and maintains the focal length constant during obturation periods. The control apparatus includes a lever oscillated by means coupled to the film advance drive mechanism, which lever operates one or another selectively engaging pawls to intermittently drive cooperating oppositely pitched ratchet wheels fixed to the shaft that determines focal length by its angular position. A manual control lever coupled to the pawl assembly disengages both pawls when in an intermediate position. When moved to a second position, the control lever selectively positions one pawl in operative engagement with its respective ratchet wheel to drive the shaft intermittently in one direction in synchronism with the oscillation of the first mentioned lever and the film drive mechanism. When the control lever is moved to a third position, the other pawl engages its ratchet wheel to drive the shaft in the other direction.

A principal object of the present invention is to provide a cinematographic apparatus with focal length varying means comprising synchronization means to synchronize the focal length variations with the stand-still periods of the film.

The invention, both as to construction of an exemplary embodiment and its method of operation, together with additional objects and advantages thereof, will be best understood from the following description when read in conjunction with the accompanying drawings, in which.

DETAILED DESCRIPTION

Figure 1:
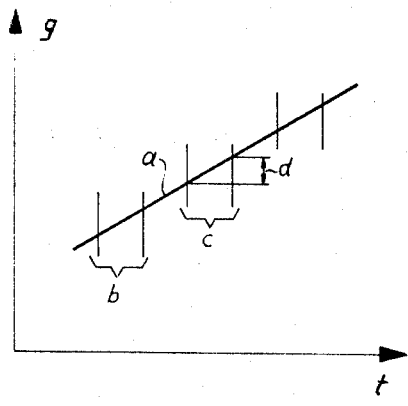
FIG. 1 is a diagramatic illustration of prior art focal length variation.

In FIG. 1, the diagram illustrates the prior art continuous magnification $g$ variation in function of time $t$. This variation (for example, an increase) is illustrated by line $a$ on which two obturation periods $b$ and $c$ are indicated. During one of the obturation periods, the magnification value has an increased value $d$, which results in the aforementioned jerks.

Figure 2:
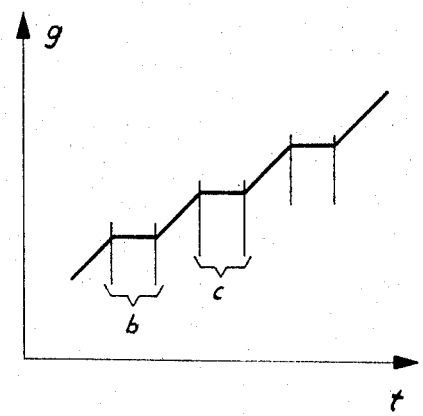
FIG. 2 is a diagramatic illustration of focal length variation according to the present invention.

In FIG. 2, the diagram illustrates in a similar way the operation of the focal length variation of the present invention. During obturation periods $b$ and $c$, the magnification does not vary. The magnification variation occurs concurrently with the periods between the obturation periods.

Figure 3:
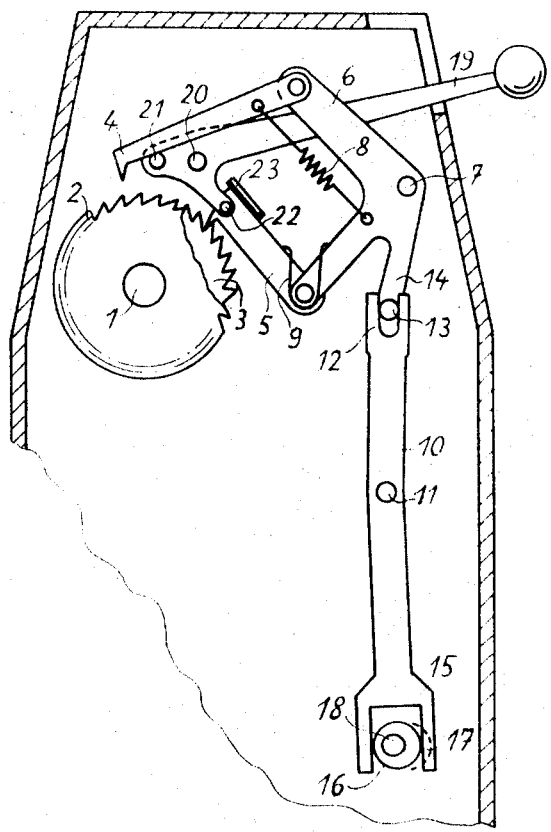
FIG. 3 is a sectional view illustrating a preferred embodiment focal length variation mechanism.

FIG. 3 is a schematic sectional view of a camera on a plane which is perpendicular to the optical axis. The variofocal lens, not shown, is moved by a shaft 1, the rotation of which varies the focal length of the lens. This shaft supports two ratchet 2 and 3 wheels adjacently mounted on said shaft and having oppositely directed or pitched gears or teeth. Wheels 2 and 3 respectively are rotated in opposite directions by two disengaging pawls 4 and 5, articulated on a lever 6 provided with three elements. Lever 6 is pivotably mounted on a pin 7 which is fixed relative to the casing or frame of the camera. The disengaging pawl 4 is biased toward wheel 2 by a tension spring 8, while the disengaging pawl 5 is biased toward the wheel 3 by a leaf spring 9.

The pivotal movements of the lever 6 are controlled by a lever 10 pivoted about pin 11 mounted on the camera frame. The opposed ends 12 and 15 of lever 10 are provided with fork-like elements. End 12 is in operative engagement with a pin 13 fixed on the arm 14 of lever 6. End 15 engages one of two eccentric drives 16 and 17 having different eccentricity and mounted on the drive shaft 18 of the film advance mechanism (not further shown). Drive shaft 18 rotates once for any one film image advance, that is one frame advance.

Operative engagement between the pawls 4 and 5 and respective ratchet wheels 2 and 3 is controlled by a control lever 19 pivoted about fixed pin 20. Lever 19, which represents a manual command, is provided with two fingers or pins 21 and 22 arranged generally as shown. Pin 21 extends across the plane of pawl 4 and operatively cooperates with pawl 4 to engage it with or disengage it from wheel 2. Pin 22 extends toward pawl 5 and controls the movement of pawl 5 into and out of operative engagement with ratchet wheel 3 by contacting flange 23 formed on pawl 5. When lever 19 is in the position shown in FIG. 3, pawl 5 is in operative engagement with ratchet wheel 3 and pin 22 is spaced from flange 23.

The lever 19 occupies two other positions. First when pivoted counter-clockwise to an intermediate position, the pin 22 contacts flange 23 and moves pawl 5 out of engagement with the ratchet wheel 3, preventing said wheel from being driven by oscillating movements of the lever 6. In this position of lever 19, the pin 21 and spring 8 operate to bring pawl 4 toward wheel 2, but said elements do not allow an operative contact between said pawl 4 and wheel 2. Accordingly, neither wheel 2 nor 3 is engaged when lever 19 is in the intermediate position and shaft 1 does not rotate.

By pivoting the lever 19 further counter-clockwise, it reaches a third position where the pin 21 carries the pawl 4 into operative relationship with the wheel 2. Thus, lever 19 is able to occupy three different positions, whereby the two extreme ones permit the motion of shaft 1 in one or respectively the other sense, while the intermediate position is that in which the shaft 1 is at rest and is not put in motion. The lever 19 is biased to the intermediate position by a spring arrangement, not shown.

In the illustrated position, shaft 18 has a position which corresponds with the end of the obturation phase.

During the frame exposure, the rotation of shaft 18 displaces the eccentric drive 16 from the right side to the left side of the rotation axis, thus pivoting lever 10 clockwise. The lever 6 thus pivots counter-clockwise, and, depending upon the position of lever 19, pawl 4 or 5 moves the ratchet wheel 2 counter-clockwise or the ratchet wheel 3 clockwise by one angular unit. During the half-rotation of shaft 18, which brings the eccentric drive 16 back to the position represented in FIG. 3, the lever 6 pivots clockwise and the selected disengaging pawl 4 or 5 jumps over the teeth of the ratchet wheel without moving it. Thus, the successive focal length modifications are always obtained during the stop or rest period of the film which excludes the aforementioned jerks during projection.

An advantage of the present mechanism resides in the fact that it is simple but reliable in construction and has a good mechanical efficiency. With the invention, the motion forces necessary to drive the focal length adjustment ring are taken from the drive shaft that is put into action by the camera motor. With commercially-available cameras the forces used for the focal length adjustment ring are mechanically independent of the camera motor, thus comprising a greater drain on the camera battery.

Also in the present invention, a special speed reducer coupled to the high speed camera motor is not needed, which reduces the cost of parts and manufacture.

It is evident other mechanism may be provided to synchronize the focal length variation periods with the film rest periods without departing from the scope of the present invention. For example, it may be possible to provide a zoom lens drive mechanism which rotates with constant rate. A brake is provided to periodically stop the drive mechanism in synchronism with the obturation periods. In such an arrangement, the transmission of the motion of the motor to the mechanism subjected to the action of the brake could be assured by a friction coupling.

Other and further modifications can be made to the herein disclosed example without departing from the present invention.

We claim:

1. A cinematographic camera including,
    a. a zoom lens
    b. focal length varying means for varying the focal length of said zoom lens
    c. an intermittent film advance mechanism, said
    d. coupling means to synchroniously couple said means for varying the focal length with said film advance mechanism, said coupling means including means for advancing the focal length varying means continuously in one sense during successive predetermined film standstill periods and for stopping the focal length varying means at the position reached substantially at the end of each of said standstill periods and for maintaining the focal length varying means stopped at said position substantially throughout the respective following film advance period and until the focal length varying means is again advanced in said one sense.

2. A cinematographic camera provided with a zoom lens comprising focal length varying means for varying the focal length of the lens in one sense during successive ones of predetermined film standstill periods and for fixing the focal length substantially throughout each of the obturation periods at the focal length reached at the end of the next previous standstill period and wherein said focal length varying means comprises a shaft mounted for rotation to vary the lens focal length and having at least one ratchet wheel mounted thereon and a disengaging pawl mounted for operative reciprocating movement to intermittently rotate the ratchet wheel and shaft.

3. The camera of claim 2 wherein a lever is provided for oscillating movement and being coupled to move the disengaging pawl in a reciprocating movement, one end of the lever being adapted to cooperate with an eccentric drive element supported by a drive shaft coupled to the film advance mechanism, said drive shaft rotating once for a predetermined step of the film advance.

4. The camera of claim 3 wherein at least two eccentric drive elements of different eccentricity are supported by the drive shaft, and said lever end is coupled to either one or the other of the two eccentric drive elements.

5. A cinematographic camera provided with a zoom lens comprising focal length varying means for varying the focal length of the lens during film standstill periods and for fixing the same during obturation periods and wherein said varying means comprises a shaft mounted for rotation to vary the lens focal length and having two oppositely pitched ratchet wheels mounted thereto and two disengaging pawls each associated with one of the wheels for operatively and intermittently rotating the associated wheel and said shaft in one or the other angular direction, and a control mechanism selectively movable to each of three positions and coupled to the disengaging pawls for selectively positioning one or the other disengaging pawl in operative relation with its associated ratchet wheel and concurrently positioning both pawls out of operative relationship with the ratchet wheels depending upon the selected position of the control mechanism.

* * * * *